(12) United States Patent
Chang

(10) Patent No.: US 9,724,842 B2
(45) Date of Patent: Aug. 8, 2017

(54) METHOD OF MAKING A BUFFER BOARD OF A TREADMILL

(71) Applicant: Chung-Fu Chang, Changhua County (TW)

(72) Inventor: Chung-Fu Chang, Changhua County (TW)

( * ) Notice: Subject to any disclaimer, the term of this patent is extended or adjusted under 35 U.S.C. 154(b) by 162 days.

(21) Appl. No.: 14/852,858

(22) Filed: Sep. 14, 2015

(65) Prior Publication Data

US 2017/0072586 A1    Mar. 16, 2017

(51) Int. Cl.
*A63B 22/02* (2006.01)
*B29C 43/00* (2006.01)
*B27N 3/20* (2006.01)

(52) U.S. Cl.
CPC .............. *B27N 3/203* (2013.01); *B29C 43/00* (2013.01)

(58) Field of Classification Search
CPC ................................. B29C 43/00; A63B 22/02
See application file for complete search history.

(56) References Cited

U.S. PATENT DOCUMENTS

| 2009/0000230 | A1* | 1/2009 | Dai | B32B 9/02 52/403.1 |
| 2011/0111166 | A1* | 5/2011 | Chang | A63B 22/02 428/105 |
| 2011/0111167 | A1* | 5/2011 | Chang | A63B 22/02 428/106 |
| 2011/0274872 | A1* | 11/2011 | Yu | B27D 1/04 428/106 |

FOREIGN PATENT DOCUMENTS

KR    10-1281963 A  *  6/2013

\* cited by examiner

*Primary Examiner* — Jeff Aftergut
(74) *Attorney, Agent, or Firm* — Jackson IPG PLLC; Demian K. Jackson

(57) ABSTRACT

A method of making a buffer board of a treadmill includes a sizing step, a shade drying step, a presetting step, a clamping and heat-pressing step, a cooling step, and a die opening step. The method can easily make the desired buffer board adapted to the treadmill and can only change different dies to make buffer boards with different structures when an upper die and a lower die of a die set provide protrusions, flat surfaces or depressed surfaces, thereby reducing the manufacturing cost.

10 Claims, 14 Drawing Sheets

METHOD OF MAKING A BUFFER BOARD OF A TREADMILL

BACKGROUND OF THE INVENTION

1. Field of the Invention

This invention relates to a treadmill and relates particularly to a method of making a buffer board of a treadmill.

2. Description of the Related Art

Generally, a treadmill uses a buffer board as a support below a belt. Because a quite large treading force is imparted to the buffer board when a user runs the treadmill, there is no buffer bounce and this is quite detrimental to the user. In this regard, it is common to install a buffer cushion and a buffer mechanism under the buffer board, stick a foam layer to the buffer board and then stick a woven layer to the foam layer. The aforesaid arrangement allows the belt to operate smoothly and concurrently provides a buffering effect.

A conventional buffer board of the treadmill is disclosed by a Taiwan patent no. 1406686. This prior art discloses bamboo strips having the appropriate thickness and width. The bamboo strips are classified into longitudinal bamboo strips and latitudinal bamboo strips. At least one longitudinal bamboo strip and at least one latitudinal bamboo strip can be crossed each other and woven into a woven bamboo plywood board. The bamboo plywood board can be superimposed by a desired thickness to construct a woven bamboo laminated plywood board, thereby enhancing the strength and keeping the buffer bounce. Further, the longitudinal bamboo strips which are attached side by side and the latitudinal bamboo strip which are attached side by side can also be put over each other to construct a stacking bamboo plywood board.

Further, the bamboo structure of the buffer board of the treadmill is typically made by quartering bamboo shafts lengthwise and cutting the quartered bamboo shafts into flattened bamboo strips in an axial direction.

Thereafter, the flattened bamboo strips are woven by crossing each other to construct a buffer board.

Because the bamboo strips made by the aforementioned method have a smaller area, too many bamboos are wasted and too much waste is caused. These problems incur an increased cost and spend a lot of weaving and manufacturing time. Further, the buffer board woven by bamboo strips has larger interstices between the bamboo strips, so a worse buffering effect is brought about.

SUMMARY OF THE INVENTION

It is an object of this invention to provide a method of making a buffer board of a treadmill which can easily make the desired buffer board adapted to the treadmill and can also change different dies to make buffer boards with different structures when an upper die and a lower die of a die set provide protrusions, flat surfaces or depressed surfaces, thereby reducing the manufacturing cost.

To obtain the aforementioned object, a method of making a buffer board of a treadmill of this invention includes following steps:

Step SA1: immersing a plurality of making materials in a glue pool or coating an outer surface of each of the making materials with glue for a predetermined sizing time.

Step SA2: taking the making materials out and then placing the making materials for shade drying after the predetermined sizing time is over.

Step SA3: putting the sized making materials over one another to form a board body and then putting the board body into a die set of a hydraulic press.

Step SA4: clamping and heat-pressing the board body with the die set of the hydraulic press to heat said board body to a predetermined heating temperature for a predetermined clamping time.

Step SA5: stop heating the board body when the predetermined clamping time is over and then cooling the board body to a predetermined cooling temperature for a predetermined cooling time.

Step SA6: opening the die set after the predetermined cooling time is over.

In some embodiments, the predetermined sizing time is set from 10 minutes to 30 minutes.

In some embodiments, the board body is pre-dried before being put into the glue pool or being coated with the glue.

In some embodiments, the board body is made by putting following materials over on another, including a slip-resistant board, a film board (or cloth), a plurality of wood sheets, a five-layered long and short overlapped bamboo sheet, a plurality of wood sheets, a film board (or cloth) and a slip-resistant board which are placed in order. Herein, the bamboo sheet is made by splitting bamboo shafts in an axial direction, then pressing the bamboo shafts to become flattened and thence putting the flattened bamboo shafts over one another. The wood sheets include a wood chip plywood or a solid board.

In some embodiments, the predetermined heating temperature is set from 100° C. to 180° C., and the predetermined clamping time is set from 5 minutes to 30 minutes.

In some embodiments, the predetermined cooling temperature is set from 0° C. to 40° C., and the predetermined cooling time is set from 10 minutes to 60 minutes.

In some embodiments, the die set includes a fluid loop. The fluid loop communicates with a cold and hot water valve. The cold and hot water valve is capable of controlling an entry of a hot fluid or a cold fluid into the fluid loop in order to heat or cool the die set.

In some embodiments, the die set includes a fluid loop. The fluid loop communicates with a cold and hot water valve. The cold and hot water valve is connected to an electric heater (not shown in figures). The cold and hot water valve connected to the electric is adapted to control an entry of a cold fluid heated by the electric heater into the fluid loop for heating the die set and is adapted to shut off the electric heater for cooling the die set with the cold fluid.

In some embodiments, the die set includes an upper die and a lower die. The upper die is disposed above the lower die. The upper die and the lower die are in a relative movement and spaced apart. The upper die and the lower die have respective flat surfaces parallel to each other or have respective depressed surfaces parallel to each other.

In some embodiments, one surface of the upper die facing the lower die forms protrusions thereon.

In some embodiments, opposite surfaces of the upper die and the lower die respectively form protrusions thereon.

DETAILED DESCRIPTION OF THE PREFERRED EMBODIMENTS

Figure 1:
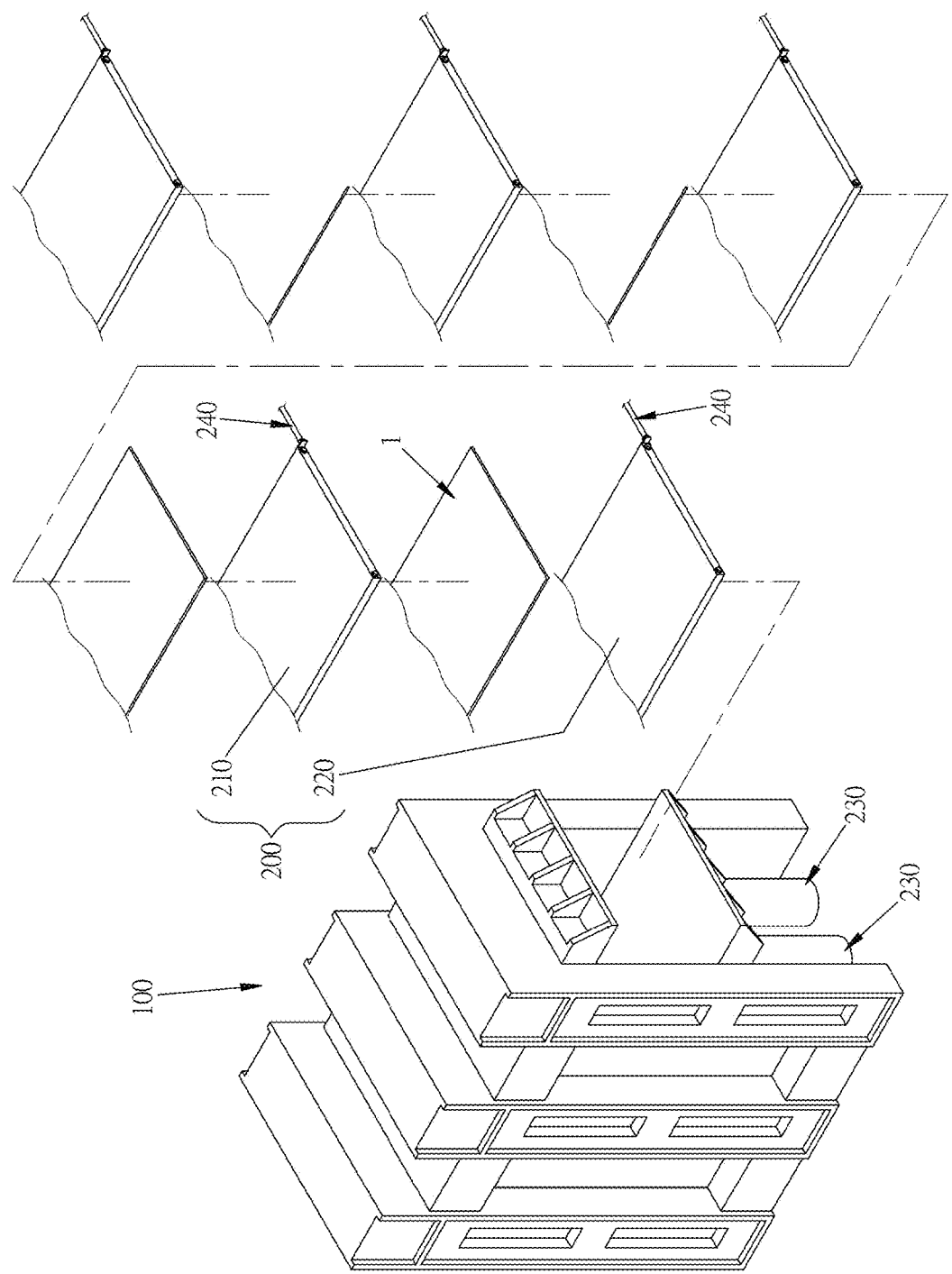
FIG. 1 is an exploded view showing a board body put into a die set of a hydraulic press of a first preferred embodiment of this invention.
Figure 2:
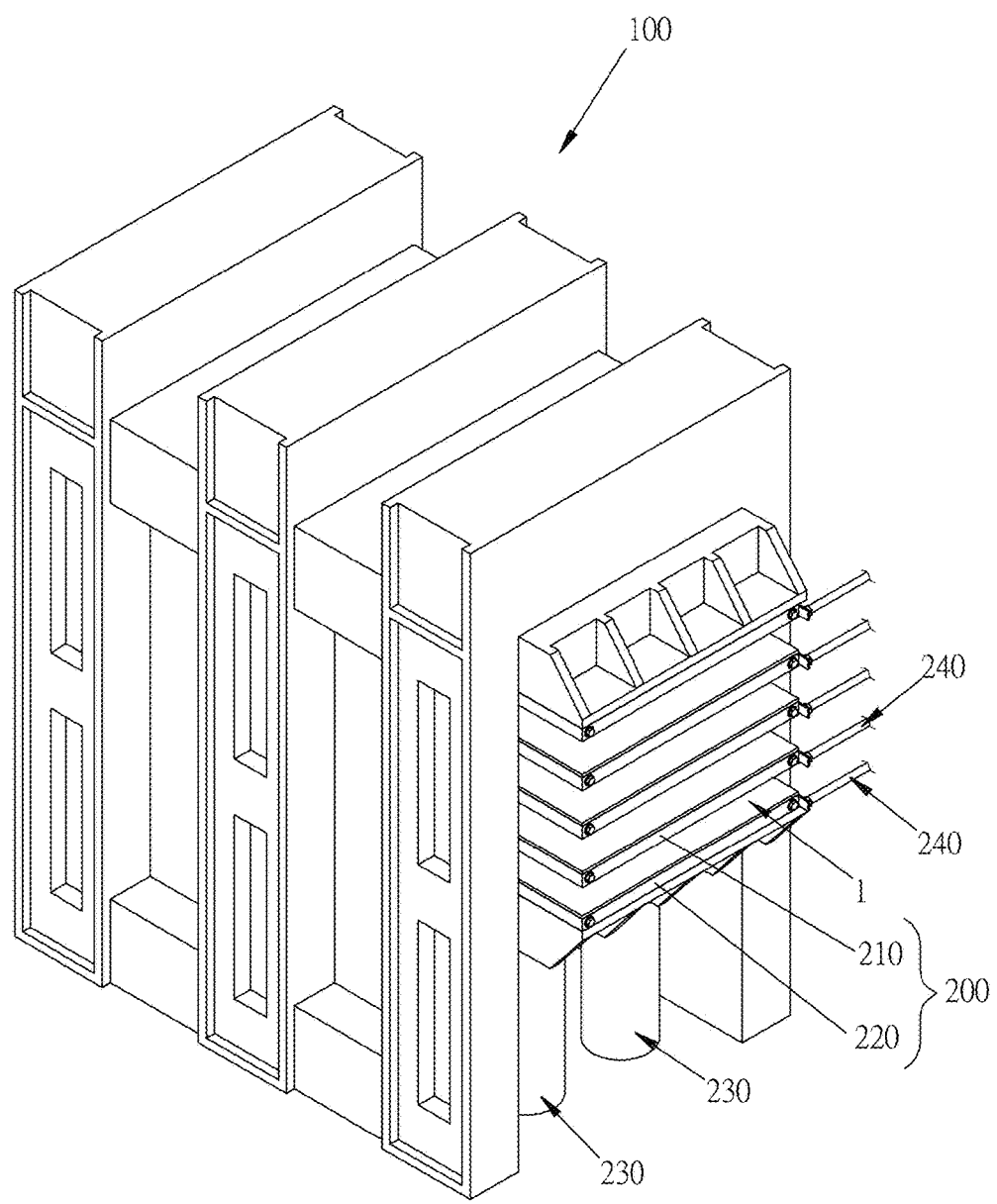
FIG. 2 is a perspective view of FIG. 1.
Figure 3:
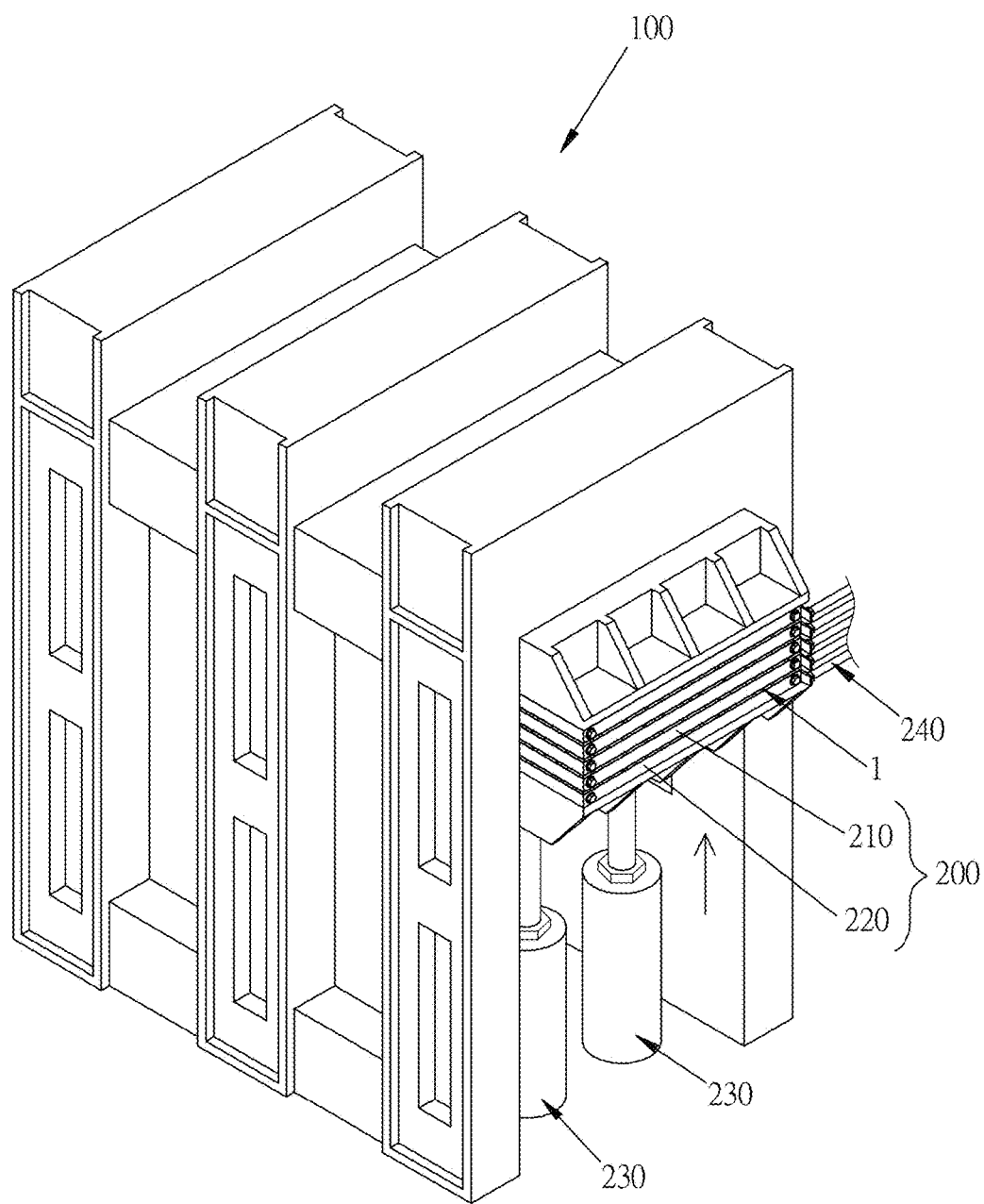
FIG. 3 is a schematic view showing a die set of FIG. 1 at the time of clamping.
Figure 4:
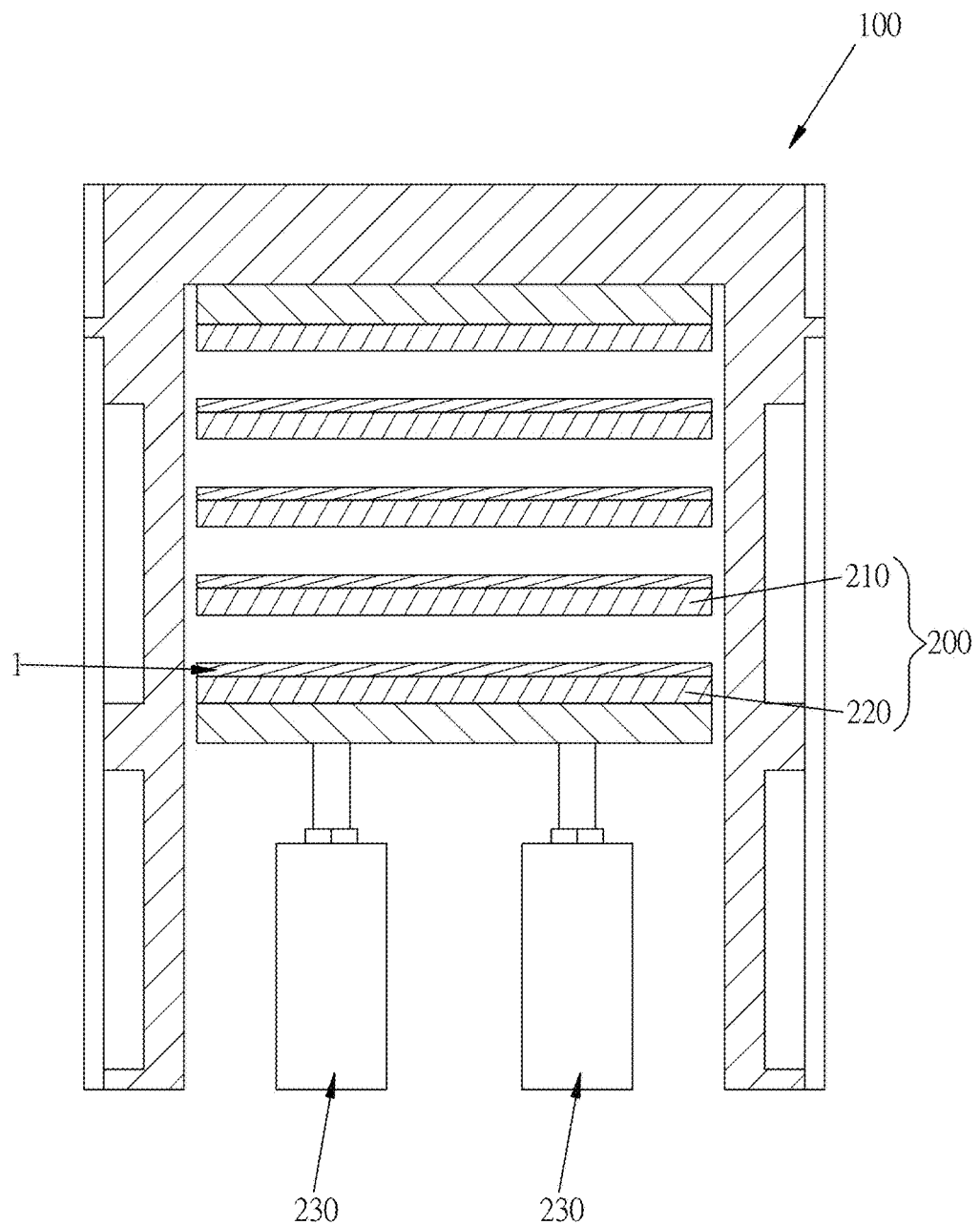
FIG. 4 is a cross-sectional view of FIG. 2.
Figure 5:
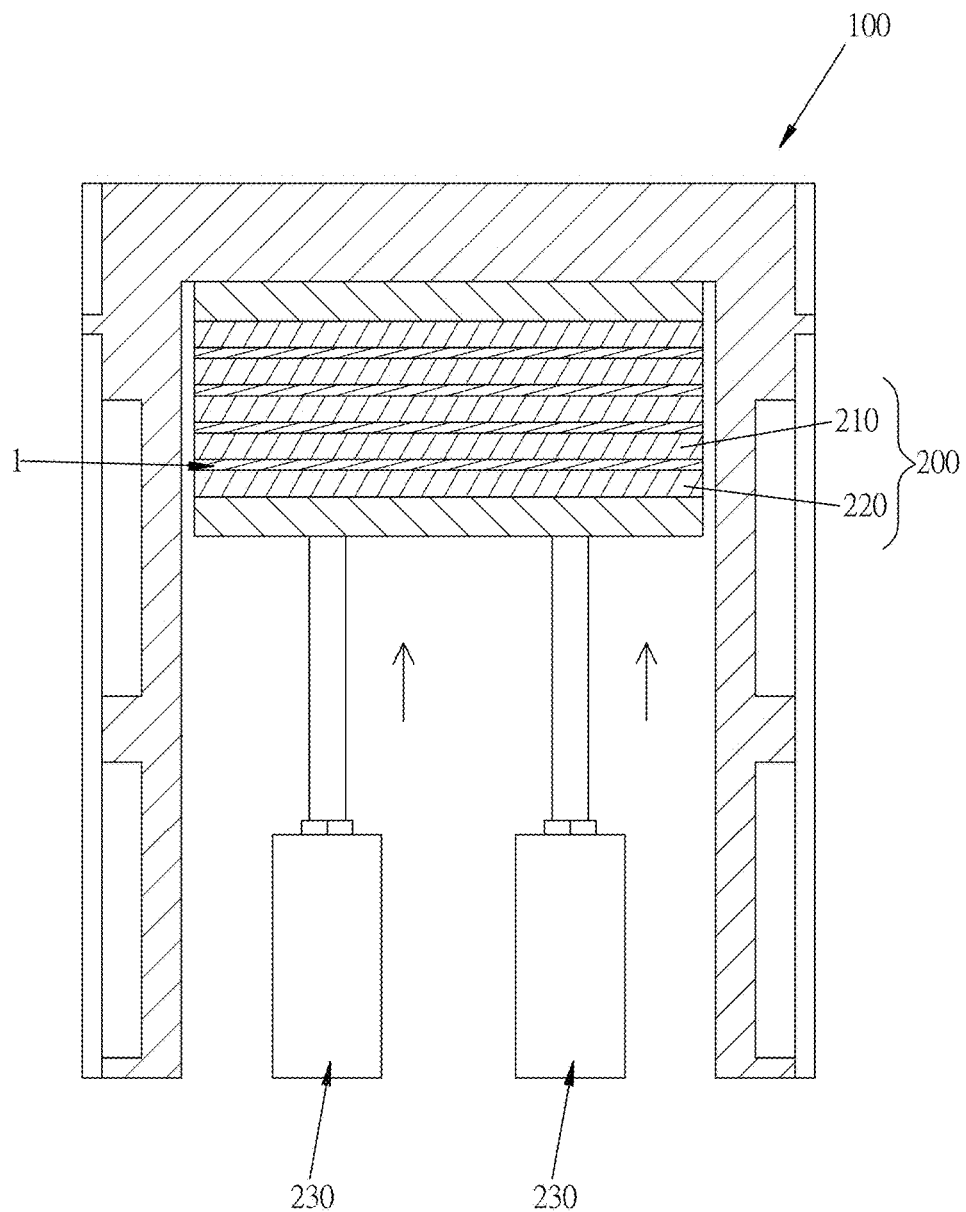
FIG. 5 is a cross-sectional view of FIG. 3.

As shown from FIG. 1 to FIG. 14, a method of making a buffer board of a treadmill of this invention includes following steps.

Step SA1 (sizing): immersing a plurality of making materials in a glue pool or coating an outer surface of each of the making materials with glue for a predetermined sizing time. Preferably, the predetermined sizing time is, but not limited to, set between 10 minutes and 30 minutes.

Step SA2 (shade drying) : taking out and drying the making materials in the shade after the predetermined sizing time is over.

Step SA3 (presetting): putting the sized making materials over one another to form a board body 1 and then putting it into a die set 200 of a hydraulic press 100. Herein, the board body is made by putting following substances, namely the making materials, over on another. The order for arrangement is a slip-resistant board, a film board (or cloth), a plurality of wood sheets, a five-layered long and short overlapped bamboo sheet, a plurality of wood sheets, a film board (or cloth) and a slip-resistant board. Herein, the bamboo sheet is made by splitting bamboo shafts in an axial direction, then pressing the bamboo shafts to become flattened and thence putting the flattened bamboo shafts over one another. The wood sheets include a wood chip plywood or a solid board.

Step SA4 (clamping and heat-pressing): using the die set 200 of the hydraulic press 100 to clamp and heat-press the board body 1 so that the board body 1 can be heated to a predetermined heating temperature for a predetermined clamping time. Preferably, the predetermined heating temperature is set between 100° C. and 180° C., and the predetermined clamping time is set between 10 minutes and 20 minutes. Herein, the hydraulic press 100 can have multiple die sets 200 to execute the clamping and heat-pressing process concurrently.

Step SA5 (cooling): stop heating the board body 1 when the predetermined clamping time is over and then cooling the board body 1 to a predetermined cooling temperature for a predetermined cooling time.

Step SA6 (die opening): opening the die set 200 after the predetermined cooling time is over in order to form a buffer board 2 of a treadmill.

Preferably, in the step SA1, the board body 1 is pre-dried before being put into the glue pool or being coated with the glue.

In the step SA5, the predetermined cooling temperature can be set from 0° C. to 40° C. The predetermined cooling time is, but not limited to, preferably set from 10 minutes to 60 minutes.

The die set 200 can have an upper die 210 and a lower die 220. The upper die 210 is disposed above the lower die 220. The upper die 210 and the lower die 221 are spaced apart and have a relative movement by a driving device 230 driven by oil pressure, air pressure, etc.

Figure 6:
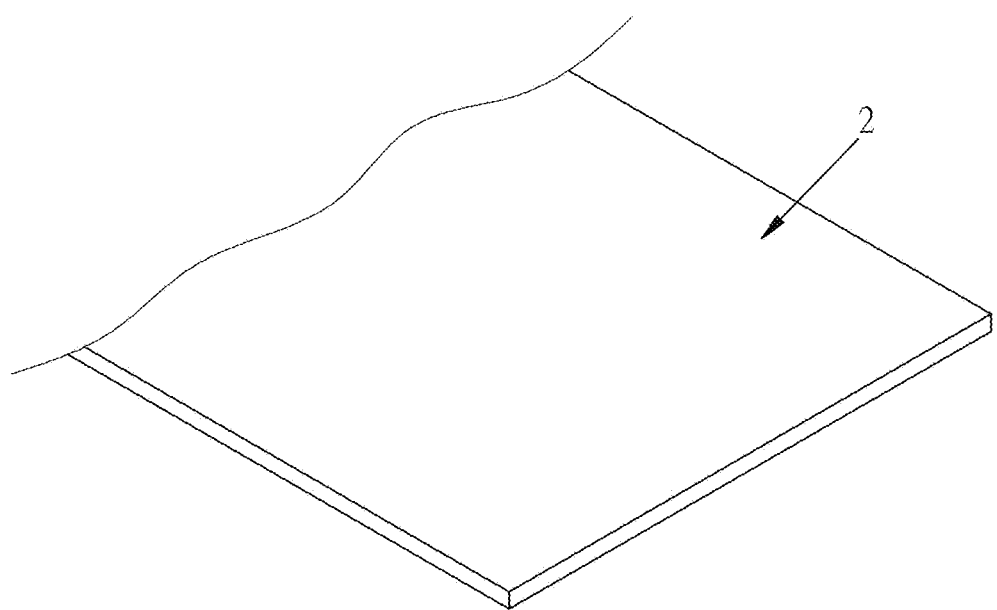
FIG. 6 is a perspective view showing a buffer board of a treadmill made by the die set of the first preferred embodiment of this invention.
Figure 7:
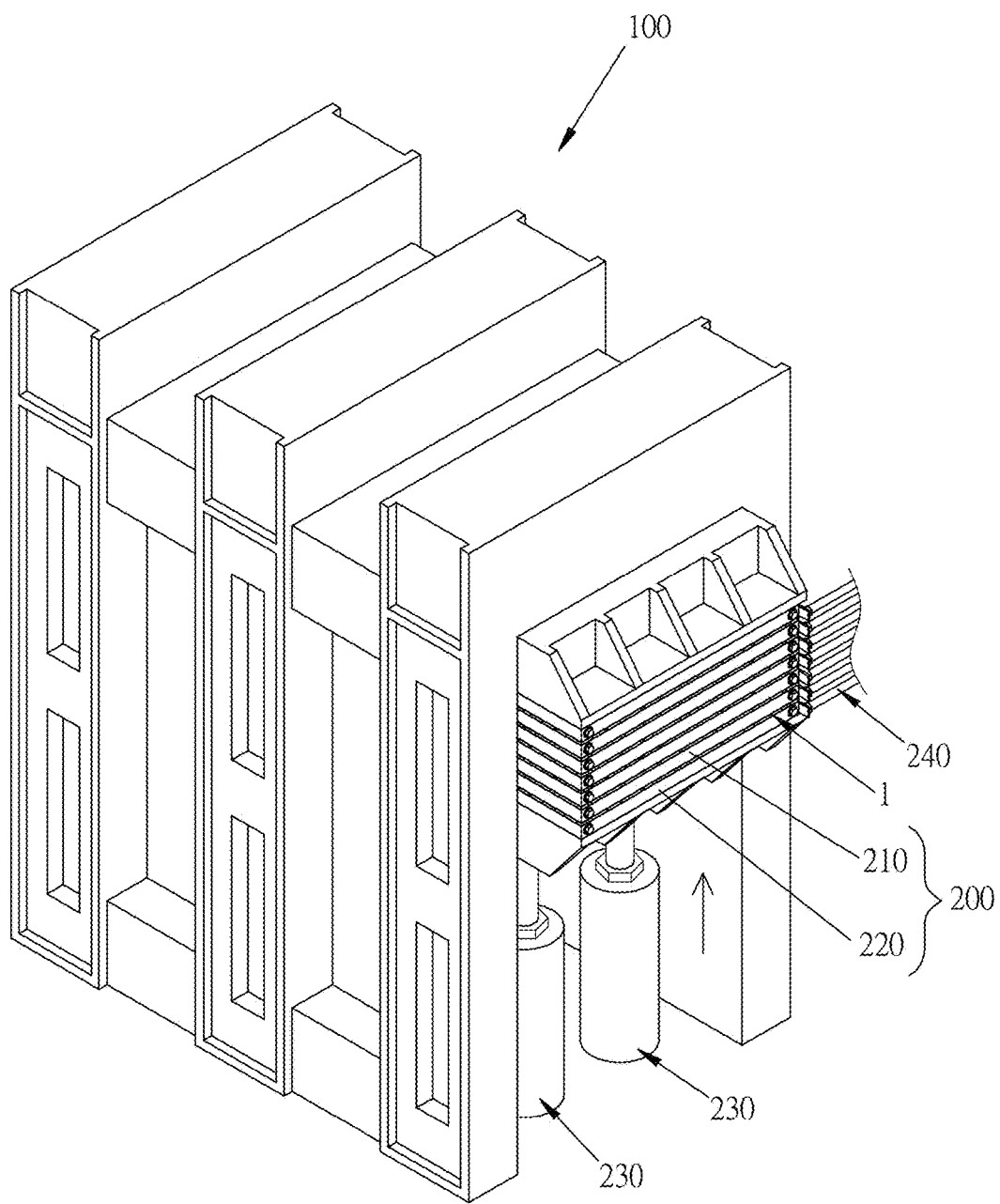
FIG. 7 is a perspective view showing a board body put into a die set of a hydraulic press of a second preferred embodiment of this invention.
Figure 8:
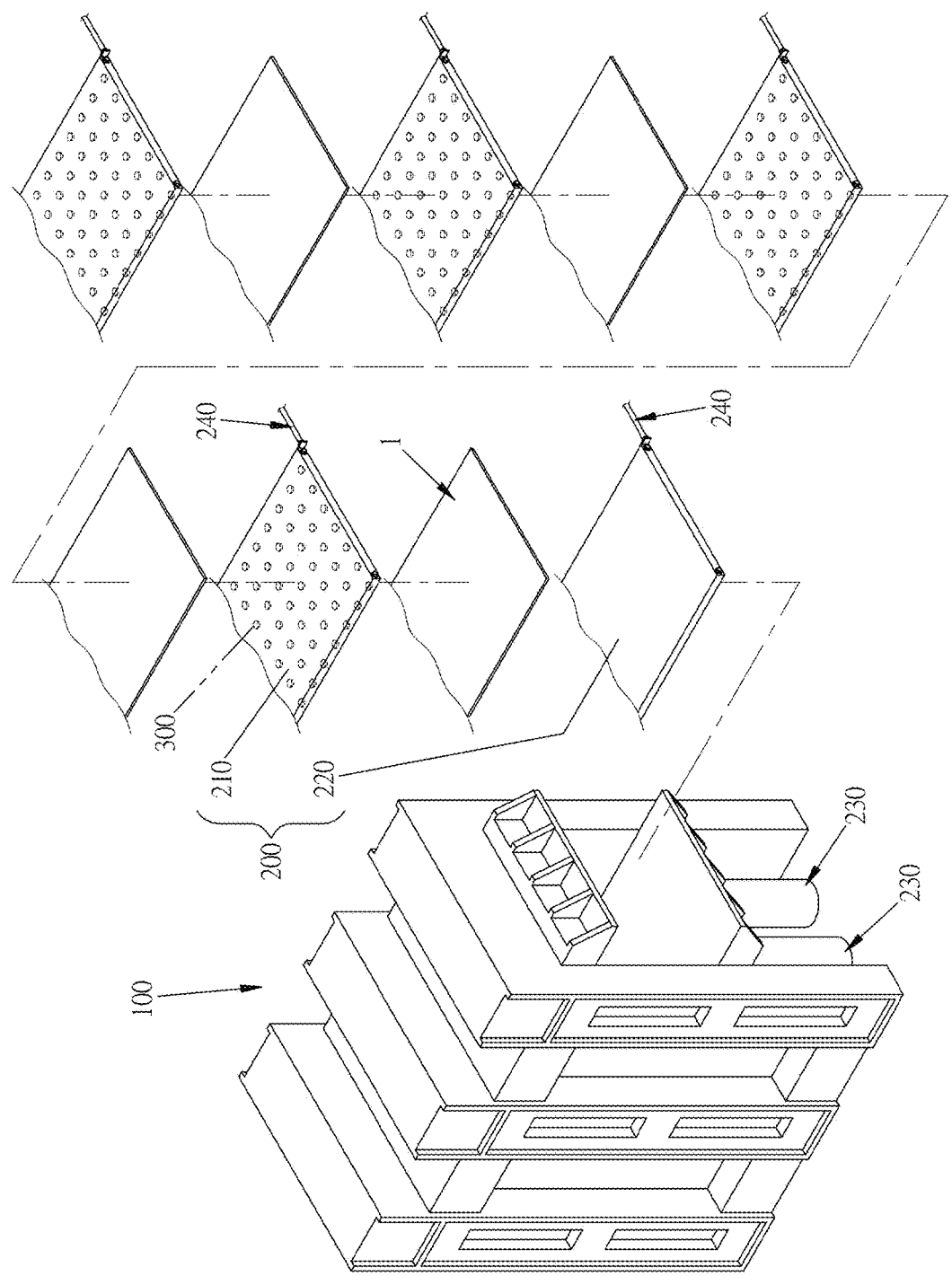
FIG. 8 is an exploded view of FIG. 7.
Figure 9:
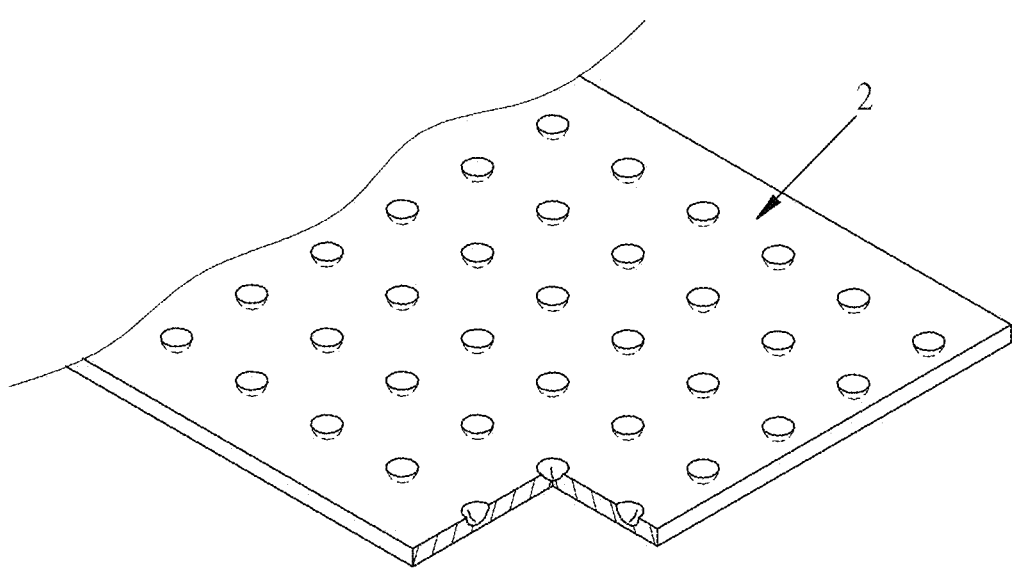
FIG. 9 is a perspective view showing a buffer board of a treadmill made by the die set of the second preferred embodiment of this invention.
Figure 10:
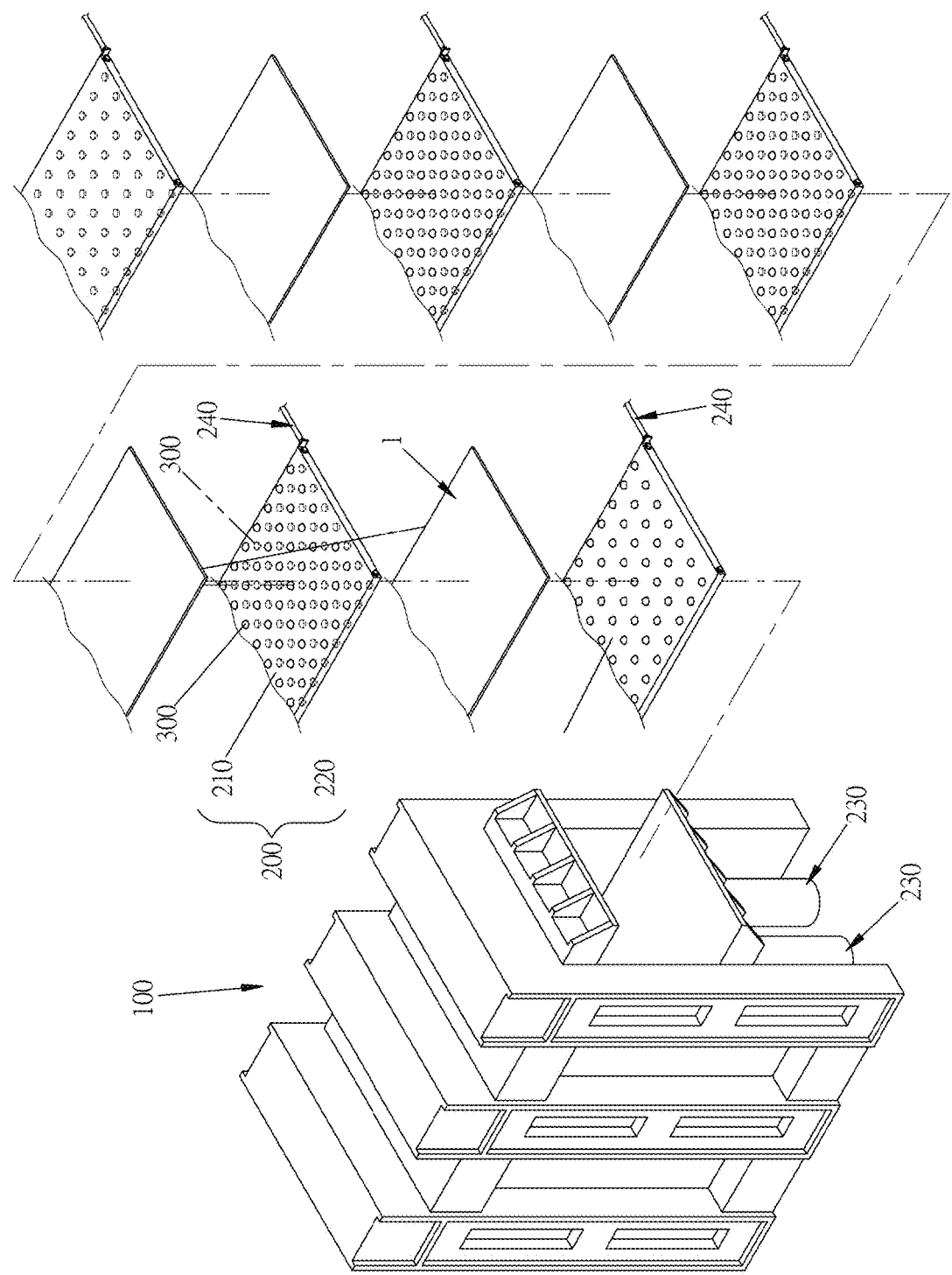
FIG. 10 is an exploded view showing a board body put into a die set of a hydraulic press of a third preferred embodiment of this invention.
Figure 11:
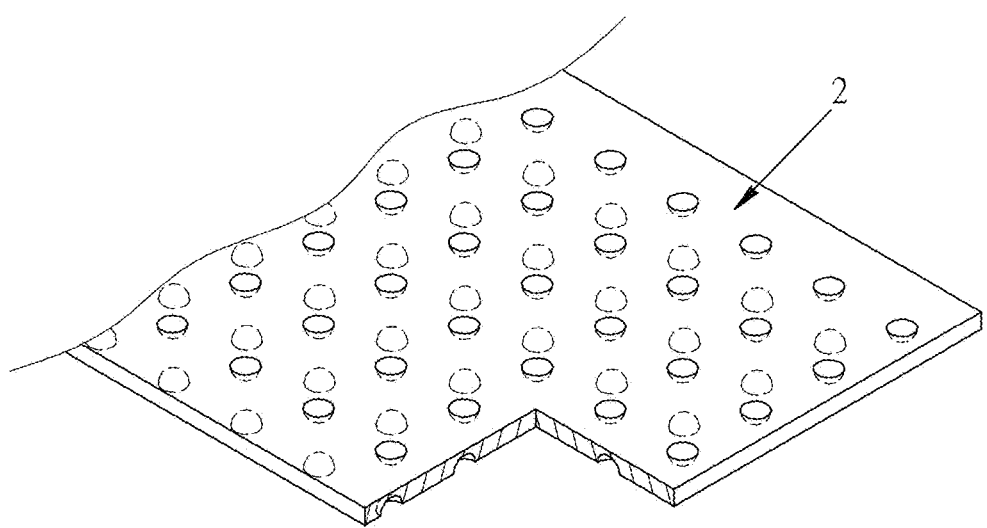
FIG. 11 is a perspective view showing a buffer board of a treadmill made by the die set of the third preferred embodiment of this invention.
Figure 12:
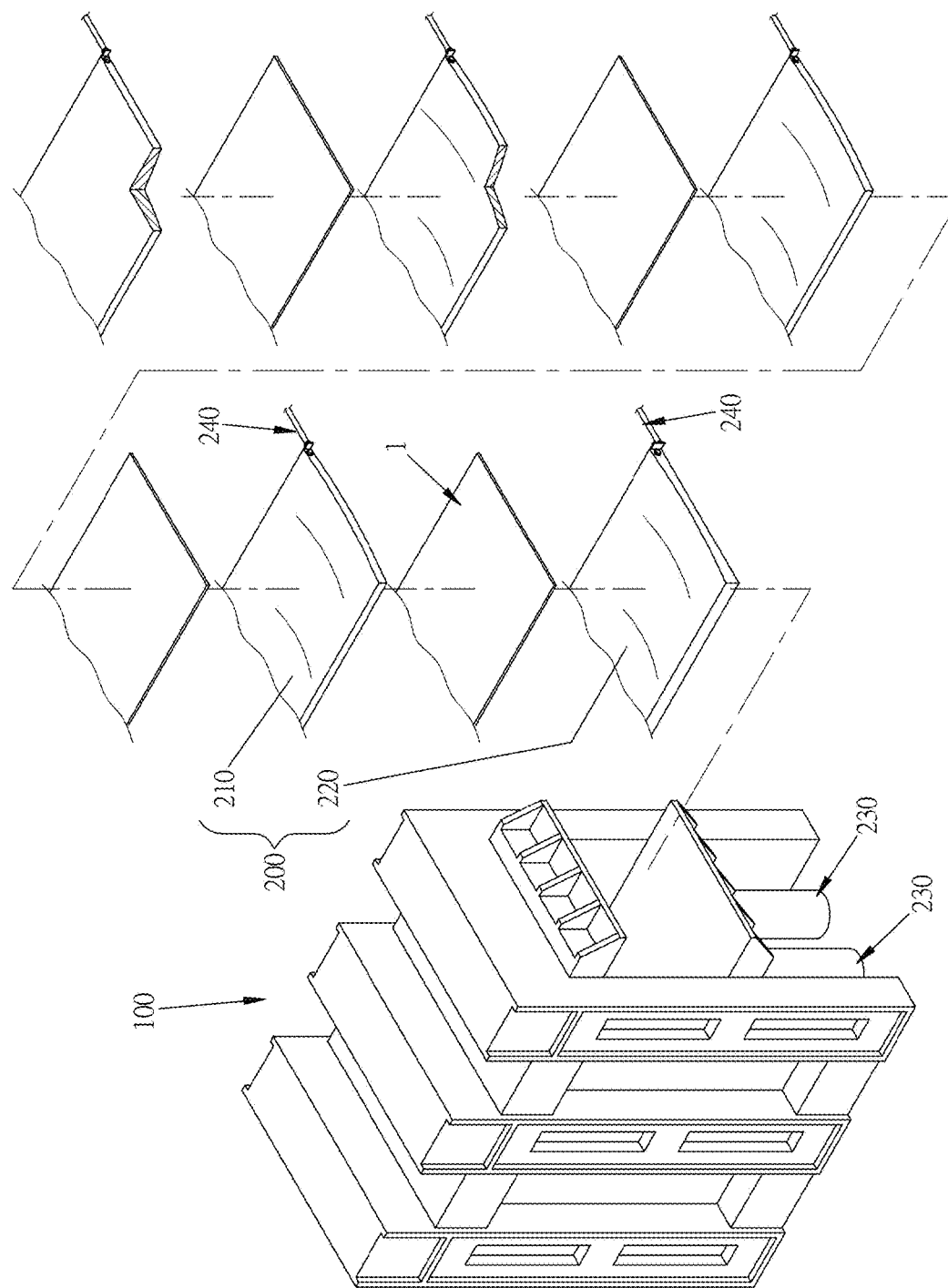
FIG. 12 is an exploded view showing a board body put into a die set of a hydraulic press of a fourth preferred embodiment of this invention.
Figure 13:
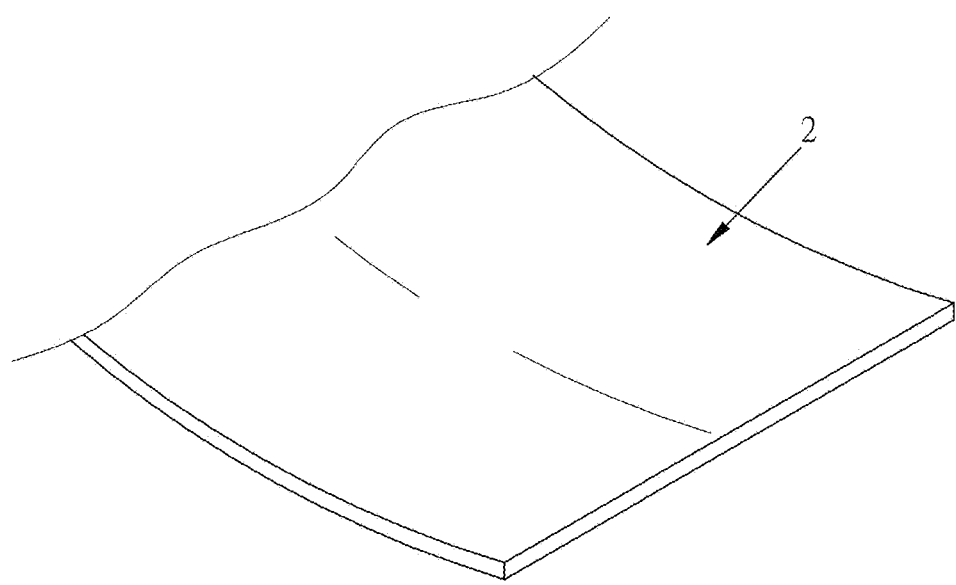
FIG. 13 is a perspective view showing a buffer board of a treadmill made by the die set of the fourth preferred embodiment of this invention.
Figure 14:
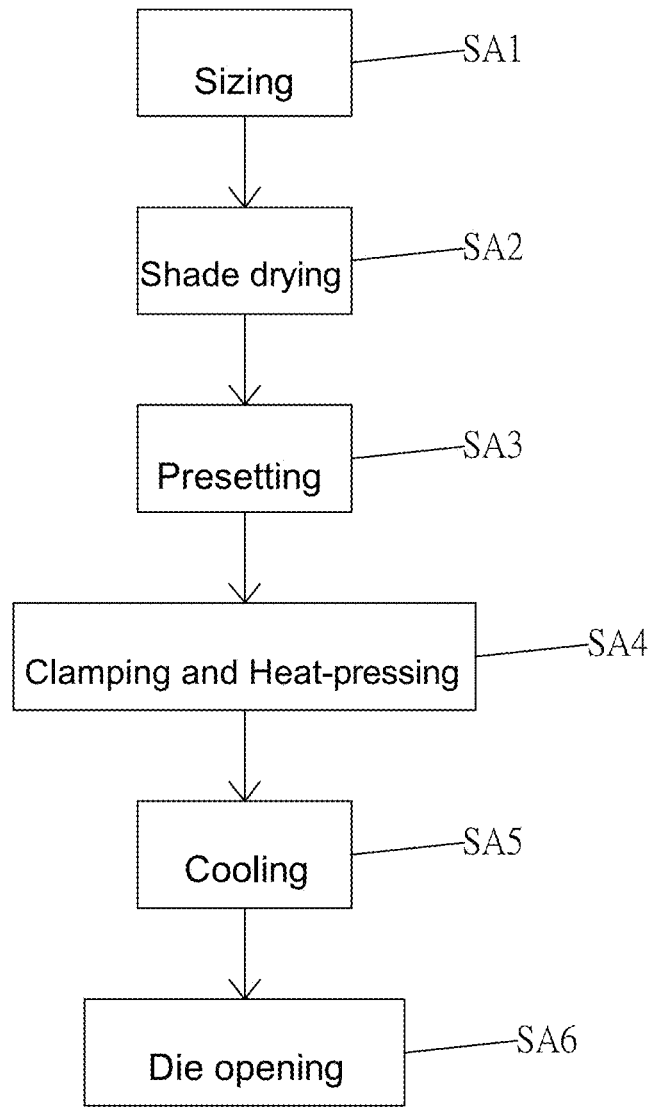
FIG. 14 is a block diagram showing the method of this invention.

The upper die 210 and the lower die 220, as shown from FIG. 1 to FIG. 5, have respective flat surfaces parallel to each other to make a buffer board 2 disclosed in FIG. 6. Alternatively, the upper die 210 and the lower die 220, as shown in FIG. 12, have respective depressed surfaces parallel to each other to make a buffer board 2 disclosed in FIG. 13. Further, one surface of the upper die 210 facing the lower die 220 forms protrusions 300 thereon, as shown in FIG. 8, thereby making a buffer board 2 disclosed in FIG. 9. Alternatively, opposite surfaces of the upper die 210 and the lower die 220 respectively form protrusions 300 thereon, as shown in FIG. 10, thereby making a buffer board 2 disclosed in FIG. 11.

The die set 200 can have a fluid loop. The fluid loop passes through the inside of the upper die 210 and the inside of the lower die 220. The fluid loop communicates with a cold and hot water valve 240. The cold and hot water valve 240 is capable of controlling an entry of a hot fluid or a cold fluid into the fluid loop in order to heat or cool the die set 200.

The die set 200 includes a fluid loop. The fluid loop passes through the inside of the upper die 210 and the inside of the lower die 220. The fluid loop communicates with a cold and hot water valve 240. The cold and hot water valve 240 is connected to an electric heater to control an entry of a cold fluid into the fluid loop for heating the die set and is adapted to shut off the electric heater (is set inside the fluid loop and herein is omitted in figures) for cooling the die set 200 with the cold fluid.

The method of this invention can easily make the desired buffer board adapted to the treadmill and can also change different dies to make buffer boards 2 with different structures when the upper die 210 and the lower die 220 of the die set 200 provide protrusions 300, flat surfaces or depressed surfaces, respectively shown in FIG. 6, FIG. 9, FIG. 11 and FIG. 13, thereby reducing the manufacturing cost.

Other embodiments may be designed according to the aforementioned preferred embodiments. These embodiments do not contravene the technique of this invention. The scope of this invention is defined by the features of claims. While the embodiments of this invention are shown and described, it is understood that further variations and modifications may be made without departing from the scope of this invention. It is noted that other similar embodiments can be made within the scope of the claims.

What is claimed is:

1. A method of making a buffer board of a treadmill comprising:

step SA1: immersing a plurality of making materials in a glue pool or coating an outer surface of each of said plurality of making materials with glue for a predetermined sizing time;

step SA2: shade drying said making materials after said predetermined sizing time is over;

step SA3: putting said sized making materials over one another to form a board body and then putting said board body into a die set of a hydraulic press;

step SA4: clamping and heat-pressing said board body with said die set of said hydraulic press to heat said board body to a predetermined heating temperature for a predetermined clamping time;

step SA5: stop heating said board body when said predetermined clamping time is over and then cooling said board body, said board body being cooled to a predetermined cooling temperature for a predetermined cooling time; and step SA6: opening said die set after said predetermined cooling time is over in order to form said buffer board of said treadmill.

2. The method of making the buffer board of the treadmill as claimed in claim 1, wherein said predetermined sizing time is set between 10 minutes and 30 minutes.

3. The method of making the buffer board of the treadmill as claimed in claim 1, wherein said board body is pre-dried before being put into said glue pool or being coated with said glue.

4. The method of making the buffer board of the treadmill as claimed in claim 1, wherein said board body is made by putting said plurality of making materials over one another, said making materials including a slip-resistant board, a film board, a plurality of wood sheets, a five-layered long and short overlapped bamboo sheet, a plurality of wood sheets, a film board and a slip-resistant board which are put over one another, said bamboo sheet being formed by splitting a plurality of bamboo shafts in an axial direction, then pressing said plurality of bamboo shafts to become flattened and thence putting said plurality of flattened bamboo shafts over one another, said plurality of wood sheets including a wood chip plywood or a solid board.

5. The method of making the buffer board of the treadmill as claimed in claim 1, wherein said predetermined heating temperature is set between 100° C. and 180° C., and said predetermined clamping time is set between 5 minutes and 30 minutes.

6. The method of making the buffer board of the treadmill as claimed in claim 1, wherein said predetermined cooling temperature is set between 0° C. and 40° C., and said predetermined cooling time is set between 10 minutes and 60 minutes.

7. The method of making the buffer board of the treadmill as claimed in claim 1, wherein said die set includes a fluid loop, said fluid loop communicating with a cold and hot water valve, said cold and hot water valve being capable of controlling an entry of a hot fluid or a cold fluid into said fluid loop in order to heat or cool said die set.

8. The method of making the buffer board of the treadmill as claimed in claim 7, wherein said cold and hot water valve is connected to an electric heater, is adapted to control an entry of a cold fluid from said electric heater into said fluid loop for heating said die set, and is adapted to shut off said electric heater for cooling said die set with said cold fluid.

9. The method of making the buffer board of the treadmill as claimed in claim 1, wherein said die set includes an upper die and a lower die, said upper die being disposed above said lower die, said upper die and said lower die being in a relative movement and spaced apart, said upper die and said lower die having respective flat surfaces parallel to each other or having respective depressed surfaces parallel to each other.

10. The method of making the buffer board of the treadmill as claimed in claim 9, wherein one surface of said upper die facing said lower die forms a plurality of protrusions thereon.

* * * * *